US011704803B2

(12) United States Patent
Ouyang et al.

(10) Patent No.: US 11,704,803 B2
(45) Date of Patent: Jul. 18, 2023

(54) METHODS AND SYSTEMS USING VIDEO-BASED MACHINE LEARNING FOR BEAT-TO-BEAT ASSESSMENT OF CARDIAC FUNCTION

(71) Applicant: The Board of Trustees of the Leland Stanford Junior University, Stanford, CA (US)

(72) Inventors: David Ouyang, Los Angeles, CA (US); Bryan He, Stanford, CA (US); James Zou, Stanford, CA (US); Euan A. Ashley, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 105 days.

(21) Appl. No.: 17/218,052

(22) Filed: Mar. 30, 2021

(65) Prior Publication Data
US 2021/0304410 A1   Sep. 30, 2021

Related U.S. Application Data

(60) Provisional application No. 63/002,098, filed on Mar. 30, 2020.

(51) Int. Cl.
  *G06K 9/00*   (2022.01)
  *G06T 7/10*   (2017.01)

(52) U.S. Cl.
  CPC ...... *G06T 7/10* (2017.01); *G06T 2207/10016* (2013.01); *G06T 2207/10132* (2013.01);
  (Continued)

(58) Field of Classification Search
  CPC . G06T 2207/10132; G06T 2207/30048; G06T 2207/10016; G06T 2207/20081;
  (Continued)

(56) References Cited

U.S. PATENT DOCUMENTS 6,106,466 A   8/2000   Sheehan et al.
7,693,315 B2  4/2010   Krishnan et al.
(Continued)

FOREIGN PATENT DOCUMENTS

WO   2005081168 A2   9/2005
WO   2015058044 A1   4/2015
(Continued)

OTHER PUBLICATIONS

Hasmila A. Omar; Arijit Patra; João S. Domingos, et al. "Automated Myocardial Wall Motion Classification using Handcrafted Features vs a Deep CNN-based mapping", 2018 40th Annual International Conference of the IEEE Engineering in Medicine and Biology Society (EMBC), Oct. 28, 2018, pp. 3140-3143 (Year: 2018).*
(Continued)

*Primary Examiner* — Atiba O Fitzpatrick
(74) *Attorney, Agent, or Firm* — KPPB LLP

(57) ABSTRACT

Various embodiments are directed to video-based deep learning evaluation of cardiac ultrasound that accurately identify cardiomyopathy and predict ejection fraction, the most common metric of cardiac function. Embodiments include systems and methods for analyzing images obtained from an echocardiogram. Certain embodiments include receiving video from a cardiac ultrasound of a patient illustrating at least one view the patient's heart, segmenting a left ventricle in the video, and estimating ejection fraction of the heart. Certain embodiments include at least one machine learning algorithm.

10 Claims, 10 Drawing Sheets
(9 of 10 Drawing Sheet(s) Filed in Color)

(52) U.S. Cl.
CPC ............... *G06T 2207/20081* (2013.01); *G06T 2207/30048* (2013.01); *G06T 2207/30104* (2013.01)

(58) Field of Classification Search
CPC . G06T 2207/20084; G06T 2207/30104; G06T 7/0016; G06T 7/10; G06T 7/174; G06T 7/11; G06K 9/6256; G06K 9/6257; G06K 9/6259; G06V 10/70; G06V 10/82; G06V 10/774–7796; G06N 3/02–126; G06N 20/00–20
See application file for complete search history.

(56) References Cited

U.S. PATENT DOCUMENTS

| | | | |
|---|---|---|---|
| 7,925,064 | B2 | 4/2011 | Cloutier et al. |
| 2018/0218502 | A1* | 8/2018 | Golden .................... G06T 7/11 |
| 2019/0104949 | A1* | 4/2019 | Cadieu .................... G16H 50/20 |
| 2019/0279361 | A1* | 9/2019 | Meyer ...................... G06T 7/11 |
| 2020/0125852 | A1* | 4/2020 | Carreira ................... G06V 20/41 |
| 2021/0113190 | A1* | 4/2021 | Errico ...................... G06N 3/0445 |
| 2021/0150693 | A1* | 5/2021 | Fornwalt .................. A61B 8/14 |
| 2021/0312622 | A1* | 10/2021 | Buckler .................. G06T 7/0012 |
| 2021/0365786 | A1* | 11/2021 | Abolmaesumi ......... G16H 50/20 |
| 2021/0390689 | A1* | 12/2021 | Buckler .................. G06V 10/25 |

FOREIGN PATENT DOCUMENTS

| | | |
|---|---|---|
| WO | 2019153039 A1 | 8/2019 |
| WO | 2019178404 A1 | 9/2019 |

OTHER PUBLICATIONS

Ardila et al., "End-to-end lung cancer screening with three-dimensional deep learning on low-dose chest computed tomography", Nat. Med., Jun. 2019, vol. 25, pp. 954-961, published online May 20, 2019, doi: 10.1038/s41591-019-0447-x.
Behnami et al., "Automatic Detection of Patients with a High Risk of Systolic Cardiac Failure in Echocardiography", In Deep Learning in Medical Image Analysis and Multimodal Learning for Clinical Decision Support, Springer, Sep. 20, 2018, pp. 65-73.
Bui et al., "Epidemiology and risk profile of heart failure", Nature Reviews Cardiology, vol. 8, Jan. 2011, pp. 30-41.
Chen et al., "Rethinking Atrous Convolution for Semantic Image Segmentation", arXiv:1706.05587 [cs.CV], Dec. 5, 2017, 14 pgs.
Chioncel et al., "Epidemiology and one-year outcomes in patients with chronic heart failure and preserved, mid-range and reduced ejection fraction: an analysis of the ESC Heart Failure Long-Term Registry", European Journal of Heart Failure, 2017, vol. 19, pp. 1574-1585, published online Apr. 6, 2017, doi:10.1002/ejhf.813.
Cole et al., "Defining the real-world reproducibility of visual grading of left ventricular function and visual estimation of left ventricular ejection fraction: impact of image quality, experience and accreditation", The International Journal of Cardiovascular Imaging, Jul. 4, 2015, vol. 31, pp. 1303-1314, DOI: 10.1007/s10554-015-0659-1.
Coudray et al., "Classification and Mutation Prediction from Non-Small Cell Lung Cancer Histopathology Images using Deep Learning", Nature Medicine, 2018, vol. 24, pp. 1559-1567.
Dellinger et al., "Surviving Sepsis Campaign: International Guidelines for Management of Severe Sepsis and Septic Shock, 2012", Intensive Care Medicine, vol. 39, No. 2, Jan. 30, 2013, pp. 165-228.
Douglas et al., "ACCF/ASE/AHA/ASNC/HFSA/HRS/SCAI/SCCM/SCCT/SCMR 2011 Appropriate Use Criteria for Echocardiography", Journal of the American Society of Echocardiography, vol. 24, No. 3, Mar. 1, 2011, pp. 229-267.
Esteva et al., "Dermatologist-level classification of skin cancer with deep neural networks", Nature, Feb. 2, 2017, vol. 542, No. 7639, pp. 115-118, published online Jan. 25, 2017, doi:10.1038/nature21056.
Furiasse et al., "Automated Algorithmic Software in Echocardiography", Journal of The American College of Cardiology, Sep. 29, 2015, vol. 66, No. 13, pp. 1467-1469, http://dx.doi.org/10.1016/j.jacc.2015.05.009.
Ghorbani et al., "Deep learning interpretation of echocardiograms", Nature Partner Journals, Digital Medicine, Jan. 4, 2020, vol. 3, No. 10, 10 pgs., https://doi.org/10.1038/s41746-019-0216-8.
Gulshan et al., "Development and validation of a deep learning algorithm for detection of diabetic retinopathy in retinal fundus photographs", Journal of the American Medical Association, Dec. 13, 2016, vol. 316, No. 22, pp. 2402-2410, DOI: 10.1038/s41591-019-0536-x.
Huang et al., "Accuracy of left ventricular ejection fraction by contemporary multiple gated acquisition scanning in patients with cancer: comparison with cardiovascular magnetic resonance", Journal of Cardiovascular Magnetic Resonance, Mar. 24, 2017, vol. 19, No. 34, 9 pgs., https://doi.org/10.1186/s12968-017-0348-4.
Koh et al., "A comprehensive population-based characterization of heart failure with mid-range ejection fraction", European Journal of Heart Failure, Dec. 2017, vol. 19, No. 12, pp. 1624-1634, published online Sep. 25, 2017, doi:10.1002/ejhf.945.
Lang et al., "Recommendations for cardiac chamber quantification by echocardiography in adults: an update from the American Society of Echocardiography and the European Association of Cardiovascular Imaging", European Heart Journal—Cardiovascular Imaging, 2015, vol. 16, pp. 233-271, doi:10.1093/ehjci/jev014.
Leclerc et al., "Deep Learning for Segmentation Using an Open Large-Scale Dataset in 2D Echocardiography", arXiv:1908.06948v2 [eess.IV] Aug. 22, 2019, 33 pgs.
Madani et al., "Fast and accurate view classification of echocardiograms using deep learning", npj | Digital Medicine, Mar. 21, 2018, vol. 1, No. 6, 31, 8 pgs., doi:10.1038/s41746-017-0013-1.
Malm et al., "Accurate and reproducible measurement of left ventricular volume and ejection fraction by contrast echocardiography: a comparison with magnetic resonance imaging", Journal of the American College of Cardiology, Sep. 1, 2004, vol. 44, No. 5, pp. 1030-1035, doi:10.1016/j.jacc.2004.05.068.
Mcmurray et al., "ESC Guidelines for the diagnosis and treatment of acute and chronic heart failure 2012", European Journal of Heart Failure, vol. 14, No. 8, Aug. 2012, pp. 803-869.
Narula et al., "Machine-Learning Algorithms to Automate Morphological and Functional Assessments in 2D Echocardiography", Journal of the American College of Cardiology, Nov. 29, 2016, vol. 68, No. 21, pp. 2287-2295, http://dx.doi.org/10.1016/j.jacc.2016.08.062.
Omar et al., "Artificial Intelligence-Based Assessment of Left Ventricular Filling Pressures from 2-Dimensional Cardiac Ultrasound Images", JACC: Cardiovascular Imaging, Mar. 2018, vol. 11, No. 3, pp. 509-510.
Ouyang et al., "Interpretable AI for beat-to-beat cardiac function assessment", https://www.medrxiv.org/content/10.1101/19012419v2, Nov. 27, 2019, 23 pgs.
Papolos et al., "U.S. Hospital Use of Echocardiography: Insights From the Nationwide Inpatient Sample", Journal of the American College of Cardiology, Feb. 9, 2016, vol. 67, Issue 5, pp. 502-511, https://doi.org/10.1016/j.jacc.2015.10.090.
Pellika et al., "Variability in Ejection Fraction Measured By Echocardiography, Gated Single-Photon Emission Computed Tomography, and Cardiac Magnetic Resonance in Patients With Coronary Artery Disease and Left Ventricular Dysfunction", Journal of the American Medical Association, Aug. 3, 2018, vol. 1, No. 4, e181456, 13 pgs., doi: 10.1001/jamanetworkopen.2018.1456.
Poplin et al., "Prediction of cardiovascular risk factors from retinal fundus photographs via deep learning", Nat Biomed Eng., Mar. 2018, vol. 2, No. 3. pp. 158-164. published online Feb. 19, 2018, doi: 10.1038/s41551-018-0195-0, https://arxiv.org/ftp/arxiv/papers/1708/1708.09843.pdf.
Shah et al., "Heart Failure With Preserved, Borderline, and Reduced Ejection Fraction: 5-Year Outcomes", Journal of the American College of Cardiology, Nov. 14, 2017, vol. 70, No. 20, pp. 2476-2486, published online Nov. 12, 2017, doi: 10.1016/j.jacc.2017.08.074.

(56) References Cited

OTHER PUBLICATIONS

Shakir et al., "Chemotherapy Induced Cardiomyopathy: Pathogenesis, Monitoring and Management", Journal of Clinical Medicine Research, vol. 1, No. 1, Apr. 2009, Published Online: Mar. 24, 2009, pp. 8-12.

Tran et al., "A Closer Look at Spatiotemporal Convolutions for Action Recognition", in Proceedings—2018 IEEE/CVF Conference on Computer Vision and Pattern Recognition, CVPR 2018, Dec. 14, 2018, pp. 6450-6459, arXiv:1711.11248 [cs.CV], Apr. 12, 2018, 10 pgs.

Tran et al., "Learning Spatiotemporal Features with 3D Convolutional Networks", Proceedings of the IEEE International Conference on Computer Vision (ICCV), Santiago, Chile, Dec. 7-13, 2015, 9 pgs.

Yancy et al., "2013 ACCF/AHA Guideline for the Management of Heart Failure", Circulation, vol. 128, No. 16, Oct. 15, 2013, Online Publication: Jun. 5, 2013, pp. e240-e327.

Zhang et al., "A Computer Vision Pipeline for Automated Determination of Cardiac Structure and Function and Detection of Disease by Two-Dimensional Echocardiography", arXiv:1706.07342 [cs.CV], Jan. 12, 2018, 14 pgs.

Zhang et al., "Fully Automated Echocardiogram Interpretation in Clinical Practice", Circulation, Oct. 16, 2018, vol. 138, Issue 16, pp. 1623-1635, https://doi.org/10.1161/CIRCULATIONAHA.118.034338.

Ziaeian et al., "Epidemiology and aetiology of heart failure", Nature Reviews Cardiology, vol. 13, Mar. 3, 2016, pp. 368-378.

\* cited by examiner

METHODS AND SYSTEMS USING VIDEO-BASED MACHINE LEARNING FOR BEAT-TO-BEAT ASSESSMENT OF CARDIAC FUNCTION

CROSS REFERENCE TO RELATED APPLICATIONS

This application claims priority to U.S. Provisional Application Ser. No. 63/002,098, entitled "Methods and Systems Video-Based AI for Beat-To-Beat Assessment of Cardiac Function" to Ouyang et al., filed Mar. 30, 2020; the disclosure of which is incorporated herein by reference in its entirety.

FIELD OF THE DISCLOSURE

The present disclosure relates to assessing cardiac function, specifically, methods and systems incorporating machine learning and/or artificial intelligence algorithms for determining ejection fraction.

BACKGROUND OF THE DISCLOSURE

Accurate assessment of cardiac function is crucial for the diagnosis of cardiovascular disease, screening for cardiotoxicity and decisions regarding the clinical management of patients with a critical illness. (See e.g., Ziaeian, B. & Fonarow, G. C. Epidemiology and aetiology of heart failure. Nat. Rev. Cardiol. 13, 368-378 (2016).; Shakir, D. K. & Rasul, K. I. Chemotherapy induced cardiomyopathy: pathogenesis, monitoring and management. J. Clin. Med. Res. 1, 8-12 (2009). Dellinger, R. P. et al. Surviving Sepsis Campaign: international guidelines for management of severe sepsis and septic shock, 2012. Intensive Care Med. 39, 165-228 (2013); the disclosures of which are hereby incorporated by reference in their entireties.) However, human assessment of cardiac function focuses on a limited sampling of cardiac cycles and has considerable inter-observer variability despite years of training. (See e.g., Farsalinos, K. E. et al. Head-to-head comparison of global longitudinal strain measurements among nine different vendors: The EACVI/ASE Inter-Vendor Comparison Study. J. Am. Soc. Echocardiogr. 28, 1171-1181 (2015); Lang, R. M. et al. Recommendations for cardiac chamber quantification by echocardiography in adults: an update from the American Society of Echocardiography and the European Association of Cardiovascular Imaging. Eur. Heart J. Cardiovasc. Imaging 16, 233-271 (2015); the disclosures of which are hereby incorporated by reference in their entireties.)

SUMMARY OF THE DISCLOSURE

This summary is meant to provide examples and is not intended to be limiting of the scope of the invention in any way. For example, any feature included in an example of this summary is not required by the claims, unless the claims explicitly recite the feature.

In one embodiment, a method for analyzing images obtained from an echocardiogram includes obtaining a cardiac ultrasound video of an individual's heart illustrating at least one view of a heart of the patient, assessing at least one cardiac parameter based on the cardiac ultrasound video using a first machine learning model comprising spatiotemporal convolutions, and outputting the at least one cardiac parameter.

In a further embodiment, the spatiotemporal convolutions incorporate two dimensions of spatial information and temporal information as a third dimension.

In another embodiment, the assessing at least one cardiac parameter step further includes determining an ejection fraction of the individual's heart.

In a still further embodiment, determining the ejection fraction is accomplished by segmenting a left ventricle of the individual's heart via a second machine learning model trained for semantic segmentation of the left ventricle.

In still another embodiment, the second machine learning model incorporates atrous convolutions for frame level semantic segmentation.

In a yet further embodiment, the assessing at least one cardiac parameter step further includes determining at least one biomarker.

In yet another embodiment, the at least one biomarker is selected from B-type Natriuretic Peptide, troponin I, hemoglobin, and blood urea nitrogen.

In a further embodiment again, determining at least one biomarker is accomplished via a second machine learning algorithm trained using ablated data.

In another embodiment again, the cardiac ultrasound video is obtained in real-time or as a recording.

In a further additional embodiment, the cardiac ultrasound video is obtained from a large ultrasound device or a small ultrasound device.

In another additional embodiment, the cardiac ultrasound video is obtained across a network.

In a still yet further embodiment, an echocardiography system includes a processing device including a machine learning module for assessing at least one cardiac parameter based on the cardiac ultrasound video using a first machine learning model including spatiotemporal convolutions.

In still yet another embodiment, the spatiotemporal convolutions incorporate two dimensions of spatial information and temporal information as a third dimension.

In a still further embodiment again, assessing at least one cardiac parameter includes determining an ejection fraction of the individual's heart.

In still another embodiment again, determining the ejection fraction is accomplished by segmenting a left ventricle of the individual's heart via a second machine learning model trained for semantic segmentation of the left ventricle.

In a still further additional embodiment, the second machine learning model incorporates atrous convolutions for frame level semantic segmentation.

In still another additional embodiment, the assessing at least one cardiac parameter step further includes determining at least one biomarker.

In a yet further embodiment again, the at least one biomarker is selected from B-type Natriuretic Peptide, troponin I, hemoglobin, and blood urea nitrogen.

In yet another embodiment again, determining at least one biomarker is accomplished via a second machine learning algorithm trained using ablated data.

In a yet further additional embodiment, the system further includes an input device configured to obtain ultrasound video.

The foregoing and other objects, features, and advantages of the disclosed technology will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

DETAILED DESCRIPTION OF THE DISCLOSURE

Figure 1:
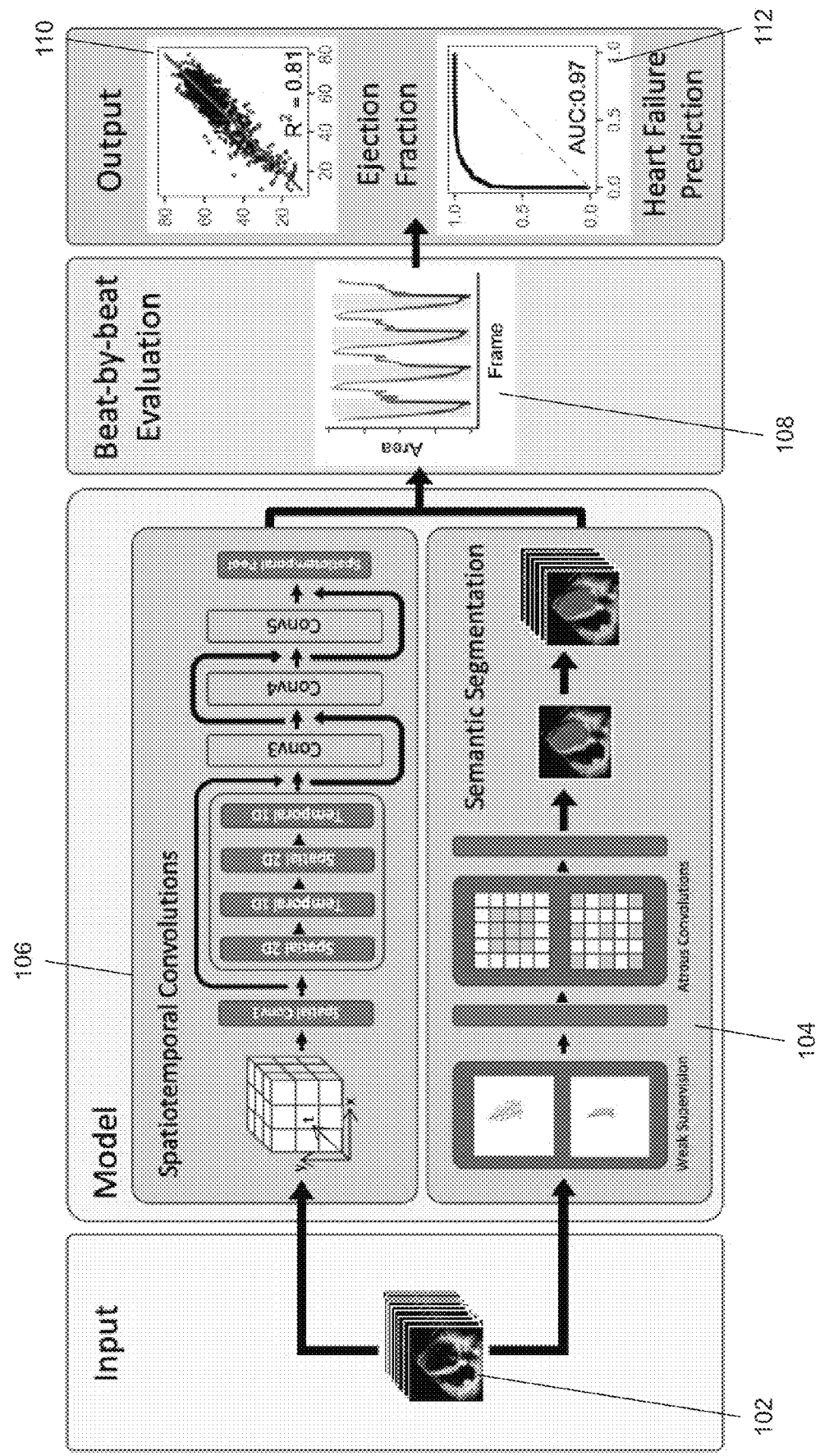
FIG. 1 illustrates a workflow in accordance with various embodiments of the invention.

Cardiac function is essential for the maintenance of normal systemic tissue perfusion; cardiac dysfunction manifests as dyspnea, fatigue, exercise intolerance, fluid retention, and increased risk of mortality. (See e.g., Ziaeian, B. & Fonarow, G. C. Epidemiology and aetiology of heart failure. Nat. Rev. Cardiol. 13, 368-378 (2016).; Shakir, D. K. & Rasul, K. I. Chemotherapy induced cardiomyopathy: pathogenesis, monitoring and management. J. Clin. Med. Res. 1, 8-12 (2009). Dellinger, R. P. et al. Surviving Sepsis Campaign: international guidelines for management of severe sepsis and septic shock, 2012. Intensive Care Med. 39, 165-228 (2013); Lang, R. M. et al. Recommendations for cardiac chamber quantification by echocardiography in adults: an update from the American Society of Echocardiography and the European Association of Cardiovascular Imaging. Eur. Heart J. Cardiovasc. Imaging 16, 233-271 (2015); McMurray, J. J. et al. ESC guidelines for the diagnosis and treatment of acute and chronic heart failure 2012. Eur. J. Heart Fail. 14, 803-869 (2012); Loehr, L. R., Rosamond, W. D., Chang, P. P., Folsom, A. R. & Chambless, L. E. Heart failure incidence and survival (from the Atherosclerosis Risk in Communities study). Am. J. Cardiol. 101, 1016-1022 (2008); Bui, A. L., Horwich, T. B. & Fonarow, G. C. Epidemiology and risk profile of heart failure. Nat. Rev. Cardiol. 8, 30-41 (2011); the disclosures of which are hereby incorporated by reference in their entireties.) Impairment of cardiac function is described as cardiomyopathy or heart failure and is a leading cause of hospitalization in the United States and a growing global health issue. (See e.g., Roizen, M. F. Forecasting the future of cardiovascular disease in the United States: a policy statement from the American Heart Association. Yearbook Anesthesiol. Pain Manage. 2012, 12-13 (2012); Yancy, C. W. et al. 2013 ACCF/AHA guideline for the management of heart failure. Circulation 128, e240-e327 (2013); the disclosures of which are hereby incorporated by reference in their entireties.) A variety of methodologies have been used to quantify cardiac function and diagnose dysfunction. In particular, measurement of left ventricular ejection fraction, the ratio of change in the left ventricular end-systolic and end-diastolic volumes, is one of the most important metrics of cardiac function, as it identifies patients who are eligible for life-prolonging therapies. (See e.g., Huang, H. et al. Accuracy of left ventricular ejection fraction by contemporary multiple gated acquisition scanning in patients with cancer: comparison with cardiovascular magnetic resonance. J. Cardiovasc. Magn. Reson. 19, 34 (2017); the disclosure of which is hereby incorporated by reference in its entirety.) However, the assessment of ejection fraction is associated with considerable interobserver variability as well as inter-modality discordance based on methodology and modality. (See e.g., Pellikka, P. A. et al. Variability in ejection fraction measured by echocardiography, gated single-photon emission computed tomography, and cardiac magnetic resonance in patients with coronary artery disease and left ventricular dysfunction. JAMA Netw. Open 1, e181456 (2018); Malm, S., Frigstad, S., Sagberg, E., Larsson, H. & Skjaerpe, T. Accurate and reproducible measurement of left ventricular volume and ejection fraction by contrast echocardiography: a comparison with magnetic resonance imaging. J. Am. Coll. Cardiol. 44, 1030-1035 (2004); Cole, G. D. et al. Defining the real-world reproducibility of visual grading of left ventricular function and visual estimation of left ventricular ejection fraction: impact of image quality, experience and accreditation. Int. J. Cardiovasc. Imaging 31, 1303-1314 (2015); the disclosures of which are hereby incorporated by reference in their entireties.)

Human assessment of the ejection fraction has variance in part due to the common finding of irregularity in the heart rate and the laborious nature of a calculation that requires manual tracing of the size of the ventricle to quantify every beat. Although the American Society of Echocardiography and the European Association of Cardiovascular Imaging guidelines recommend tracing and averaging up to five consecutive cardiac cycles if variation is identified, the ejection fraction is often evaluated from tracings of only one representative beat or visually approximated if a tracing is deemed to be inaccurate (See e.g., Koh, A. S. et al. A comprehensive population-based characterization of heart failure with mid-range ejection fraction. Eur. J. Heart Fail. 19, 1624-1634 (2017); the disclosure of which is hereby incorporated by reference in its entirety.) This results in high variance and limited precision with inter-observer variation ranging from 7.6% to 13.9%. More-precise evaluation of cardiac function is necessary, as even patients with a borderline reduction in ejection fraction have been shown to have considerably increased morbidity and mortality. (See e.g., Chioncel, O. et al. Epidemiology and one-year outcomes in patients with chronic heart failure and preserved, mid-range and reduced ejection fraction: an analysis of the ESC Heart Failure Long-Term Registry. Eur. J. Heart Fail. 19, 1574-1585 (2017); Shah, K. S. et al. Heart failure with preserved, borderline, and reduced ejection fraction: 5-year outcomes. J. Am. Coll. Cardiol. 70, 2476-2486 (2017); Papolos, A., Narula, J., Bavishi, C., Chaudhry, F. A. & Sengupta, P. P. U.S. hospital use of echocardiography: insights from the nationwide inpatient sample. J. Am. Coll. Cardiol. 67, 502-511 (2016); the disclosures of which are hereby incorporated by reference in their entireties.)

With rapid image acquisition, relatively low cost and without ionizing radiation, echocardiography is the most widely used modality for cardiovascular imaging. (See e.g., Douglas, P. S. et al. ACCF/ASE/AHA/ASNC/HFSA/HRS/SCAI/SCCM/SCCT/SCMR 2011 Appropriate use criteria for echocardiography. J. Am. Soc. Echocardiogr. 24, 229-267 (2011); Zhang, J. et al. Fully automated echocardiogram interpretation in clinical practice: feasibility and diagnostic accuracy. Circulation 138, 1623-1635 (2018); the disclosures of which are hereby incorporated by reference in their entireties.) There is great interest in using deep learning techniques for echocardiography to determine the ejection fraction. (See e.g., Madani, A., Arnaout, R., Mofrad, M. & Arnaout, R. Fast and accurate view classification of echocardiograms using deep learning. NPJ Digit. Med. 1, 6 (2018); Ghorbani, A. et al. Deep learning interpretation of echocardiograms. NPJ Digit. Med. 3, 10 (2020); Behnami, D. et al. in Deep Learning in Medical Image Analysis and Multimodal Learning for Clinical Decision Support 65-73 (Springer, 2018); the disclosures of which are hereby incorporated by reference in their entireties.) Previous attempts to algorithmically assess cardiac function with deep learning models relied on manually curated still images at systole and diastole instead of using the actual echocardiogram videos and these models had substantial error compared to human evaluation of cardiac function with $R^2$ ranging between 0.33 and 0.50. Limitations in human interpretation, including laborious manual segmentation and the inability to perform beat-to-beat quantification may be overcome by sophisticated automated approaches. Recent advances in deep learning suggest that it can accurately and reproducibly identify human-identifiable phenotypes as well as characteristics that are not recognized by human experts. (See e.g., Ardila, D. et al. End-to-end lung cancer screening with three-dimensional deep learning on low-dose chest computed tomography. Nat. Med. 25, 954-961 (2019); Poplin, R. et al. Prediction of cardiovascular risk factors from retinal fundus photographs via deep learning. Nat. Biomed. Eng. 2, 158-164 (2018); Esteva, A. et al. Dermatologist-level classification of skin cancer with deep neural networks. Nature 542, 115-118 (2017); Coudray, N. et al. Classification and mutation prediction from non-small cell lung cancer histopathology images using deep learning. Nat. Med. 24, 1559-1567 (2018); Chen, L.-C., Papandreou, G., Schroff, F. & Adam, H. Rethinking atrous convolution for semantic image segmentation. Preprint at arxiv.org/abs/1706.05587 (2017); the disclosures of which are hereby incorporated by reference in their entireties.)

To overcome current limitations in the human assessment of cardiac function, many embodiments describe an end-to-end deep learning approach for labelling of the left ventricle and estimation of the ejection fraction from input echocardiogram videos alone. Many embodiments perform frame-level semantic segmentation of the left ventricle with weakly supervised learning from clinical expert labelling. In additional embodiments, a three-dimensional convolutional neural network (CNN) with residual connections predicts clip-level ejection fraction from the native echocardiogram videos. In further embodiments, the segmentations results are combined with clip-level predictions to produce beat-to-beat evaluation of the ejection fraction. This approach provides interpretable tracings of the ventricle, which facilitate human assessment and downstream analysis, while leveraging the three-dimensional CNN to fully capture spatiotemporal patterns in the video. (See e.g., Tran, D. et al. A closer look at spatiotemporal convolutions for action recognition. in Proc. 2018 IEEE/CVF Conference on Computer Vision and Pattern Recognition (2018); Tran, D., Bourdev, L., Fergus, R., Torresani, L. & Paluri, M. Learning spatiotemporal features with 3D convolutional networks. In Proc. IEEE International Conference on Computer Vision 4489-4497 (2015); the disclosures of which are hereby incorporated by reference in their entireties.)

Many embodiments are directed to video-based deep-learning algorithms that achieve state-of-the-art assessment of cardiac function. Certain embodiments use expert human tracings for weakly supervised learning of left ventricular segmentation and spatiotemporal convolutions on video data to obtain a beat-to-beat cumulative evaluation of the ejection fraction across the entire video. The variance in predictions of numerous embodiments is comparable to or less than measurements of cardiac function by human experts. Moreover, its performance in predicting the ejection fraction was robustly accurate when used on a validation dataset of echocardiogram videos from an independent medical center without additional model training. With only one GPU, many embodiments are capable of completing these tasks in real time; each prediction task takes only 0.05 s per frame and is much more rapid than the human assessment of ejection fraction.

Many embodiments greatly decrease the labor of the cardiac function assessment by automating the segmentation task and provides the opportunity for more-frequent, rapid evaluations of cardiac function. The end-to-end approach of numerous embodiments generates beat- and clip-level predictions of the ejection fraction as well as the segmentation of the left ventricle throughout the cardiac cycle for visual interpretation of the modelling results. In settings in which the sensitive detection of change in cardiac function is critical, early detection of change can substantially affect clinical care.

Video-Based Deep Learning

In many embodiments, one or more machine learning models predict the ejection fraction for each cardiac cycle using spatiotemporal convolutions with residual connections and generates frame-level semantic segmentations of the left ventricle using weak supervision from expert human tracings. These outputs are combined to create beat-to-beat predictions of the ejection fraction and to predict the presence of heart failure with reduced ejection fraction.

Turning to FIG. 1, many embodiments comprise three main components: two CNNs and an evaluation function. FIG. 1 illustrates that for each patient, many embodiments use apical four-chamber view echocardiogram videos 102 as input. In many embodiments, the video is treated as video, in that the relational information between frames (e.g., timing data between frames). For example, if video is captured at 30 frames per second, two subsequent frames provide information showing that one frame occurs $\frac{1}{30}^{th}$ of a second after the other frame. In such embodiments, movement or activity within the video is captured (e.g., contraction or expansion). Current methods in the art treat video as a collection of images divorced of any timing or relational information in the collection of images.

Some embodiments construct a first CNN model 104 with atrous convolutions for frame-level semantic segmentation of the left ventricle. The technique of atrous convolutions enables the model to capture larger patterns and has previously been shown to perform well on non-medical imaging datasets. The standard human clinical workflow for estimating the ejection fraction requires manual segmentation of the left ventricle during end systole and end diastole. Numerous embodiments generalize these labels in a weak supervision approach with atrous convolutions to generate frame-level semantic segmentation throughout the cardiac cycle in a 1:1 pairing with the original video. In numerous embodiments, the automatic segmentation is used to identify ventricular contractions. Additionally, further embodiments provide a clinician-interpretable intermediary that mimics the clinical workflow.

Second, many embodiments train a second CNN model 106 with residual connections and spatiotemporal convolutions across frames to predict the ejection fraction. In contrast to previous CNN architectures for machine learning of medical images, this approach integrates spatial as well as temporal information with temporal information across frames as the third dimension in network convolutions. Spatiotemporal convolutions, which incorporate spatial information in two dimensions as well as temporal information in the third dimension, have not previously been used for medical data given the relative scarcity of labelled medical videos.

Returning to FIG. 1, the third main component of many embodiments is beat-by-beat evaluations 108. Such evaluations make video-level predictions of ejection fraction 110 and cardiac function 112. Given that variation in cardiac function can be caused by changes in loading conditions as well as heart rate in a variety of cardiac conditions, it is generally recommended to estimate ejection fraction for up to five cardiac cycles. However, in currently clinical practices, such determinations are not always performed, since ejection fraction estimation is generally tedious and laborious. Many embodiments remove such burdens through automation. As such, numerous embodiments identify each cardiac cycle, generate a clip of frames (e.g., 32 frames, 64 frames, etc.), and average clip-level estimates of the ejection fraction for each beat as test-time augmentation.

Determination of Ejection Fraction

Figure 2A:
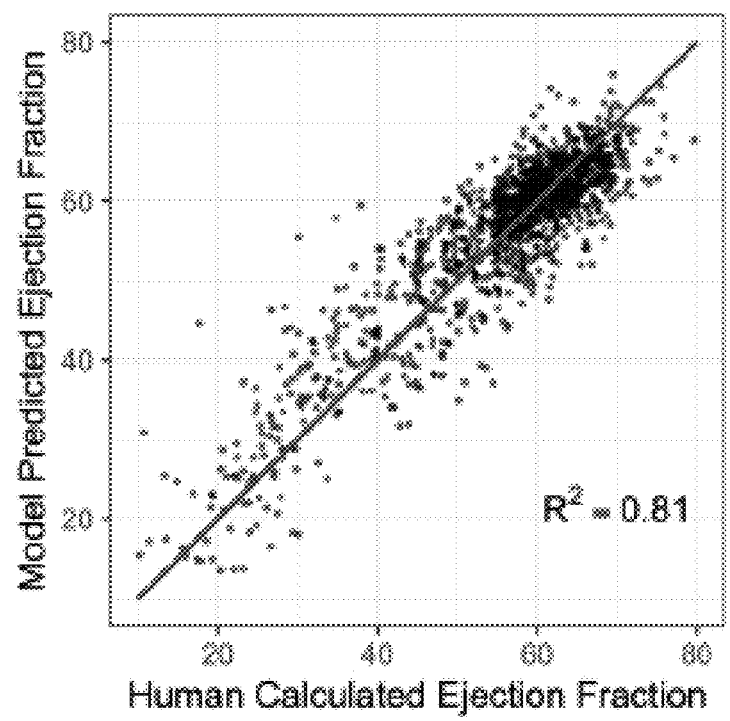
FIGS. 2A-2F illustrate determination of cardiac parameters, including ejection fraction and ventricular segmentation in accordance with various embodiments of the invention.
Figure 2B:
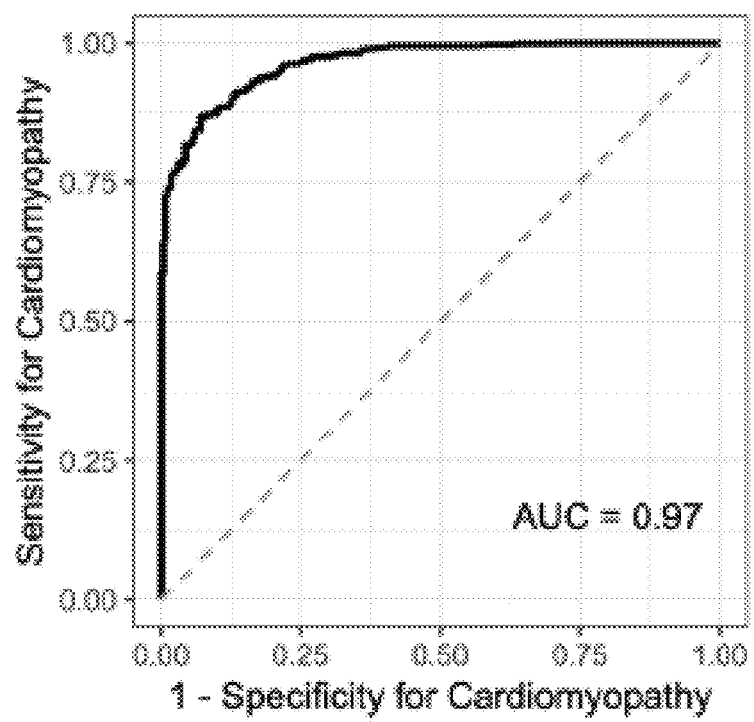

Based on a test dataset, the prediction of the ejection fraction by certain embodiments had a mean absolute error of 4.1%, root mean squared error of 5.3% and $R^2$ of 0.81 compared with the annotations by human experts. These parameters are well within the range of typical measurement variation between different clinicians, which is usually described as inter-observer variation and can be as high as 13.9% (FIG. 2A). Using a common threshold of an ejection fraction of less than 50% to classify cardiomyopathy, the prediction by certain embodiments had an area under the curve of 0.97 (FIG. 2B). The performance of many embodiments to that of several additional deep learning architectures trained with the same dataset were compared, and present embodiments are consistently more accurate, suggesting a power of the specific architecture of these embodiments (Table 1). Additionally, re-evaluation of the videos by blinded clinicians in cases in which the prediction of the ejection fraction by numerous embodiments diverged the most from the original human annotation were performed. Many of these videos had inaccurate initial human labels (in 43% of the videos, the blinded clinicians preferred the prediction of the model), poor image quality, or arrhythmias and variations in the heart rate (Table 2).

Additionally, many embodiments show cross-healthcare system reliability. For example, one embodiment was tested on an external test dataset of 2,895 echocardiogram videos from 1,267 patients from an independent hospital system. The results indicated a robust prediction of the ejection fraction with a mean absolute error of 6.0%, root mean squared error of 7.7%, $R^2$ of 0.77 and an area under the curve of 0.96 compared with the annotations by cardiologists at the independent hospital system.

Comparison with Human Variation

Figure 2C:
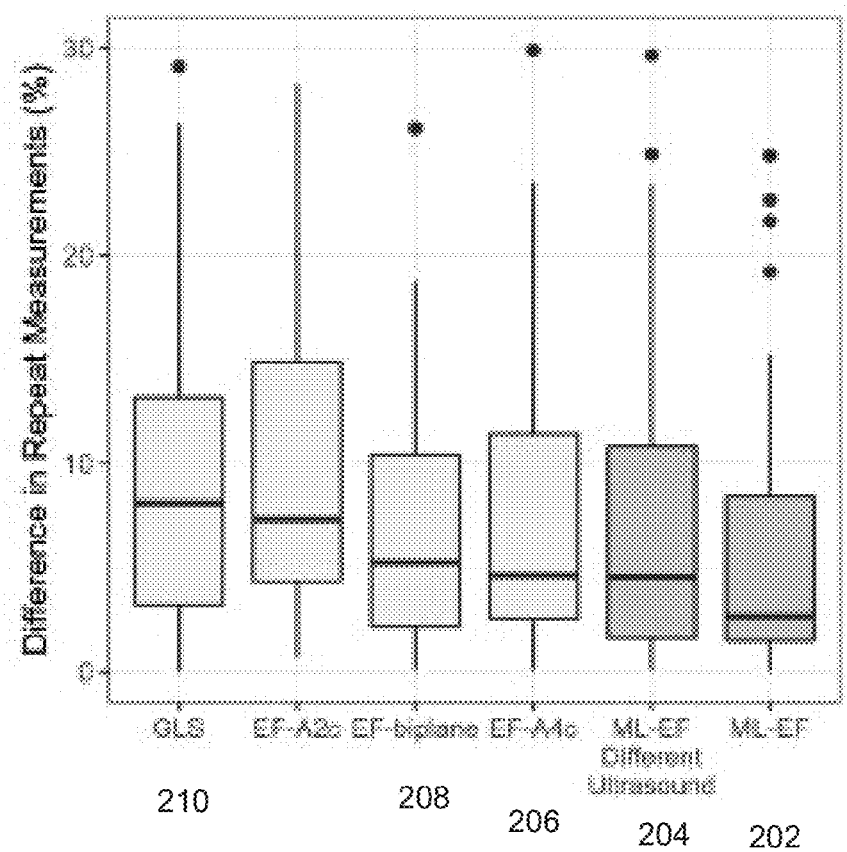

Embodiments also show reduce variability due to human-caused effects. For example, when an embodiment trained on the same ultrasound 202 as used for some patients and an embodiment trained on data from a different ultrasound 204 as used for some patients were compared to methods to determine ejection fraction, including Simpson's monoplane method 206, Simpson's biplane method 208, and global longitudinal strain 210, the exemplary embodiments less variance. As illustrated in FIG. 2C, the embodiment trained on the same ultrasound 202 had the least variance on repeated testing (median difference of 2.6%, s.d. of 6.4) compared with embodiment trained on data from a different ultrasound 204 had a variance in this case (median difference of 4.5%, s.d. of 7.0, P<0.001 for non-inferiority for all comparisons with human measurements), the ejection fraction obtained by Simpson's biplane method 208 (median difference of 5.2%, s.d. of 6.9, P<0.001 for non-inferiority), ejection fraction from Simpson's monoplane method 206 (median difference of 4.6%, s.d. of 7.3, P<0.001 for non-inferiority) and global longitudinal strain 210 (median difference of 8.1%, s.d. of 7.4%, P<0.001 for non-inferiority). The embodiment trained on data from a different ultrasound 204 had a variance in this case (median difference of 4.5%, s.d. of 7.0, P<0.001 for non-inferiority for all comparisons with human measurements).

Analysis of Ventricle Segmentation

Many embodiments automatically generate segmentations of the left ventricle and/or right ventricle. Segmentation enables clinicians to better understand how these embodiments make predictions. Additionally, segmentation is also useful because it provides a relevant point for human interjection in the workflow and for physician oversight of the model in clinical practice.

Figure 2D:
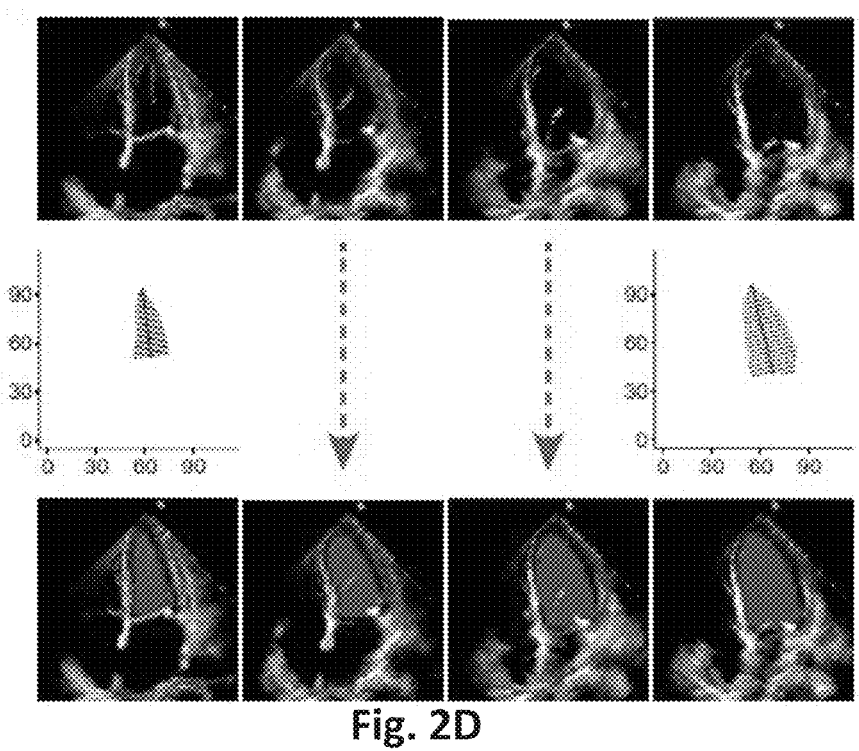
Figure 2E:
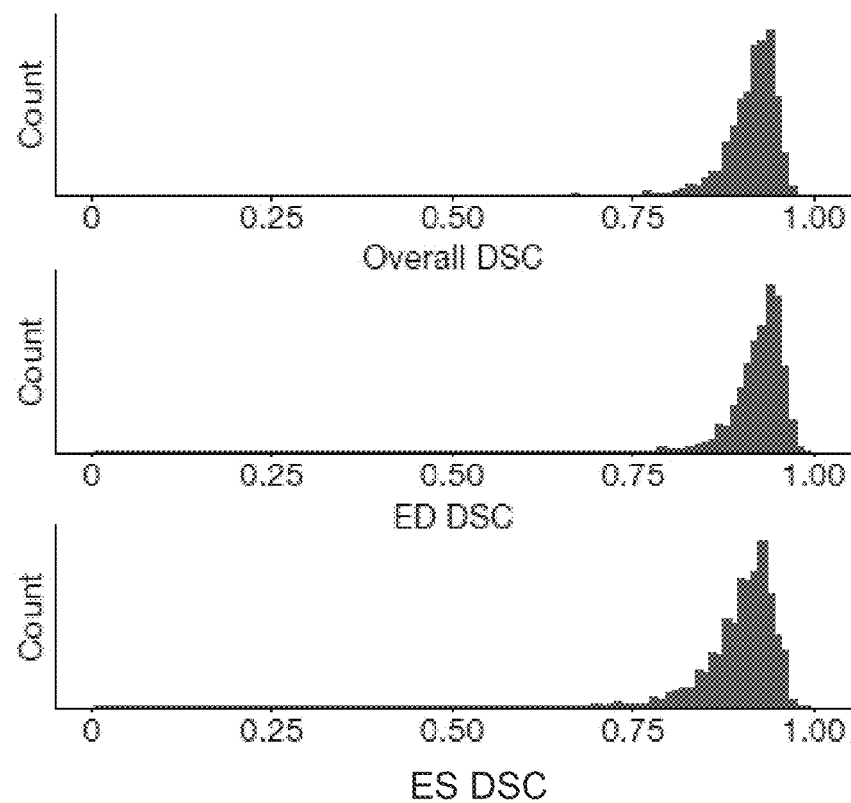
Figure 2F:
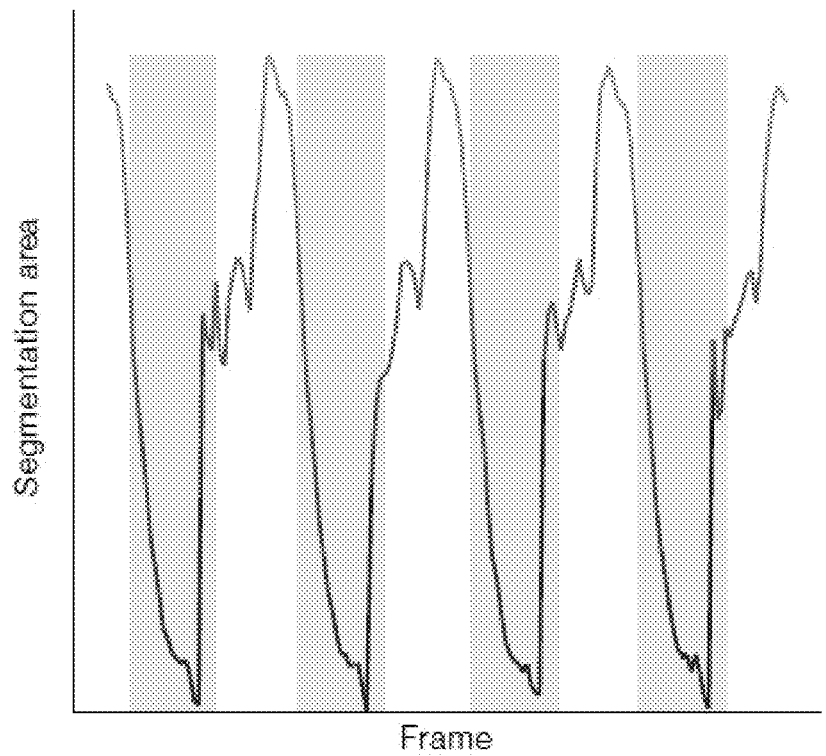

To train the segmentation model, manual segmentations are obtained via standard clinical workflows during end systole and end diastole. Implicit in the echocardiogram videos is that, in all intermediate frames, the left ventricle is constrained in shape and size between the labels at end systole and end diastole. Certain embodiments used these sparse human labels to train many embodiments to generate frame-level segmentations for the entire video (FIG. 2D). In an exemplary embodiment, the Dice similarity coefficient for the end-systolic tracing was 0.903 (95% confidence interval of 0.901-0.906) and the Dice similarity coefficient for the end-diastolic tracing was 0.927 (95% confidence interval of 0.925-0.928) (FIG. 2D). There was significant concordance in performance of end-systolic and end-diastolic semantic segmentation and the change in segmentation area was used to identify each cardiac contraction (FIGS. 2E-2F).

Beat-to-Beat Assessment

Figure 3A:
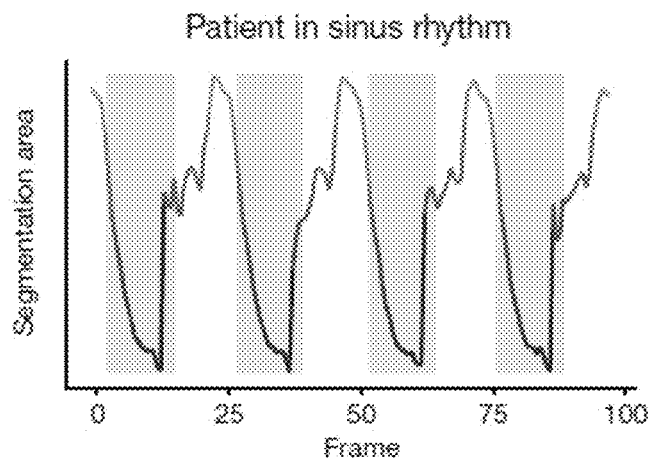
FIGS. 3A-3E illustrate exemplary data of beat-to-beat assessment in accordance with various embodiments of the invention.
Figure 3B:
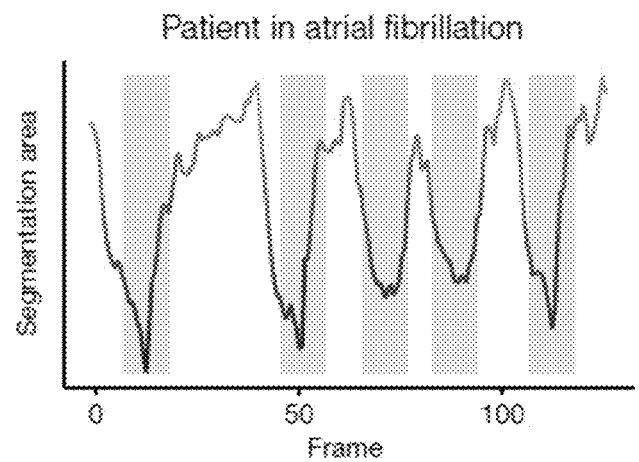
Figure 3C:
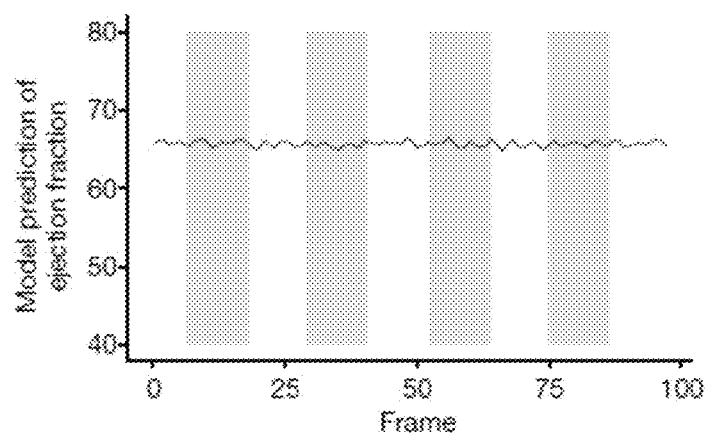
Figure 3D:
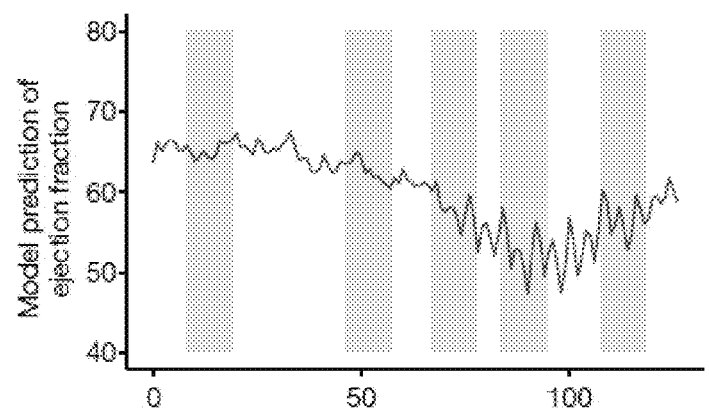
Figure 3E:
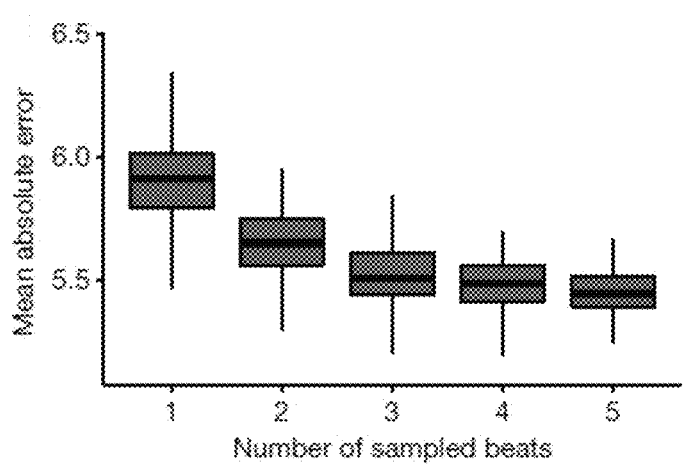
Figure 4B:
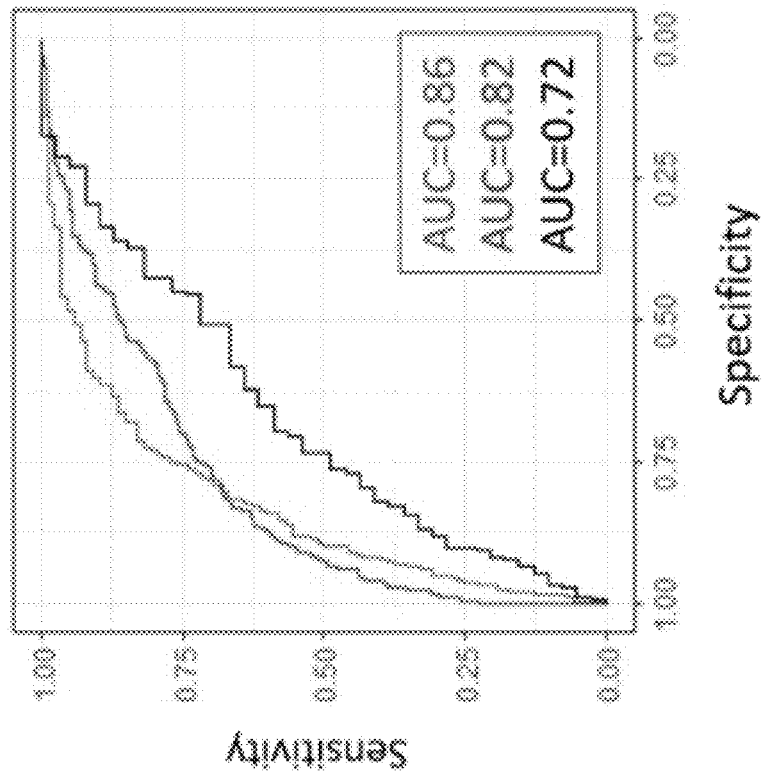
FIGS. 4A-4D illustrate exemplary ROC curves for various biomarkers in accordance with various embodiments of the invention.
Figure 4A:
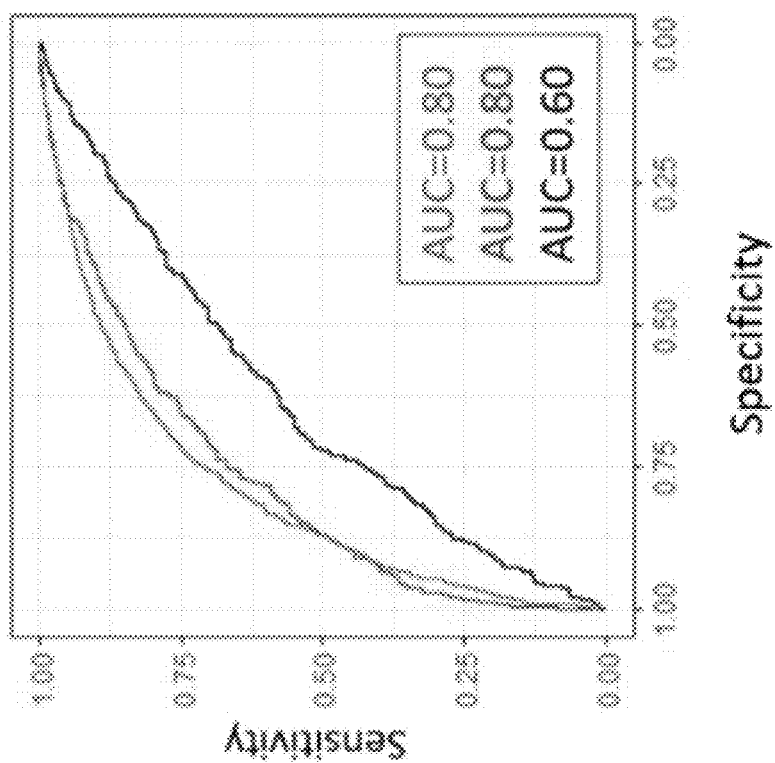
Figure 4C:
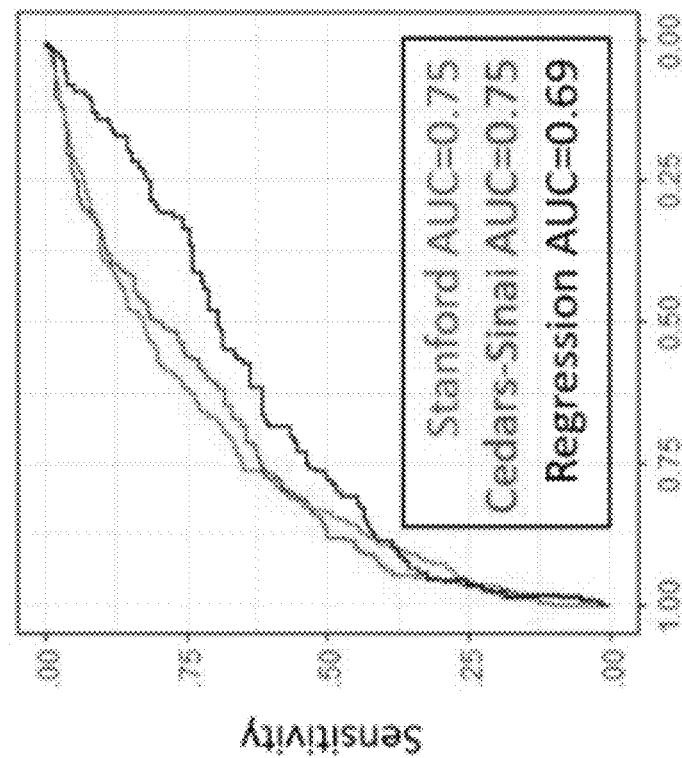
Figure 4D:
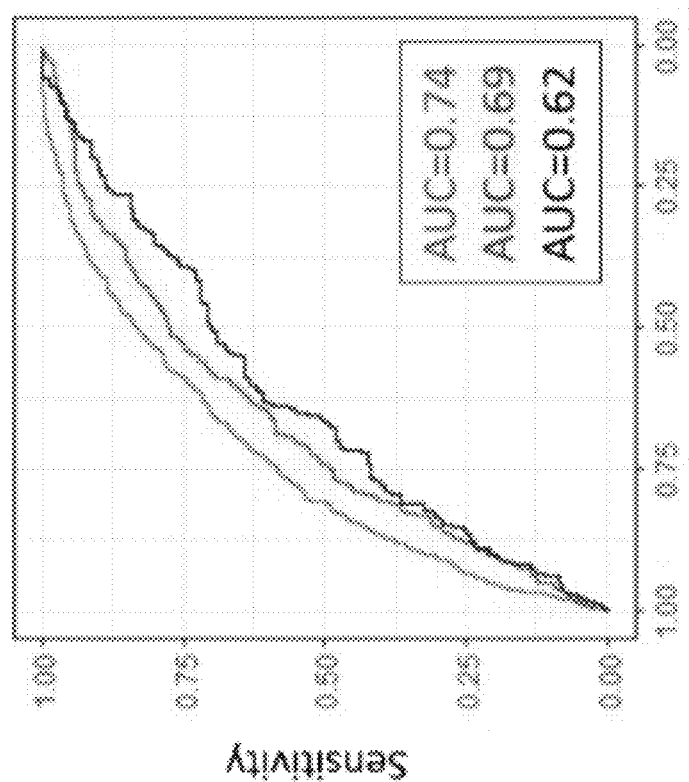

Variation in beat-to-beat model interpretation was seen in echocardiogram videos of patients with arrhythmias and ectopy. Turning to FIGS. 3A-3D illustrate how many embodiments can identify arrhythmias and atrial fibrillation by variation in intervals between ventricular contractions. Specifically, FIG. 3A illustrates ventricular contraction based on frame for an individual in normal sinus rhythm, while FIG. 3B illustrates ventricular contraction based on frame for an individual in atrial fibrillation. Similarly, FIG. 3C illustrates a modeled ejection fraction for an individual in normal sinus rhythm, while FIG. 3D illustrates a modeled ejection fraction for an individual in atrial fibrillation. FIGS. 3A-3B illustrate how the resulting variation in ventricle segmentation is associated with variation in ejection fraction determination. Additionally, FIG. 3E illustrates how many embodiments significantly reduce the estimation error of the ejection fraction by aggregating across multiple beats.

Right ventricular assessment is challenging given more variation in image acquisition, complex anatomic structure limiting assessment in one 2-dimensional view, and more limited understanding of normal function. Compared with the left ventricle, the right ventricle is poorly annotated and often requires expensive, low-throughput advanced imaging. In embodiments that segment the right ventricle, the challenge of limited human expert annotations was overcome with fuzzy augmentation, in which training dataset size was augmented by using human labels to weakly supervise preceding and subsequent frames, and constrained loss, in which an additional loss function penalizes change in segmentation prediction across frames of the video. Trained on a small number of echocardiogram videos, these embodiments accurately predict right ventricular dysfunction, pulmonary hypertension, and/or provide clues for diseases causing right ventricular dysfunction.

Assessing Biomarker Levels

Further embodiments train a machine learning model to identify additional markers, such as age, weight, gender/sex, and certain cardiac biomarkers. Biomarkers of interest include biomarkers relevant to cardiac function and myocyte damage, such as B-type Natriuretic Peptide (BNP), troponin I, as well as biomarkers of systemic physiology such as hemoglobin and blood urea nitrogen (BUN). Such embodiments can include this model in addition to a model of ventricular segmentation or in lieu of a model for segmentation. Embodiments comprising one or more models trained to recognize markers are trained using ablated data.

FIGS. 4A-4D illustrate receiver-operating characteristic (ROC) curves for prediction of hemoglobin (FIG. 4A), B-Type Natriuretic Peptide (FIG. 4B), Blood Urea Nitrogen (FIG. 4C), and Troponin I (FIG. 4D) as compared between two healthcare facilities and against a linear regression model. The AUC for each test is listed in the inset, showing that the machine learning AUC outperforms that of a regression model.

Computational Performance

With only one GPU, many embodiments rapidly perform the predictions (less than 0.05 s per prediction) and enables the real-time segmentation of the left ventricle and prediction of the ejection fraction (Table 3).

Clinical Methods for Assessing Echocardiographic Videos

Figure 5A:
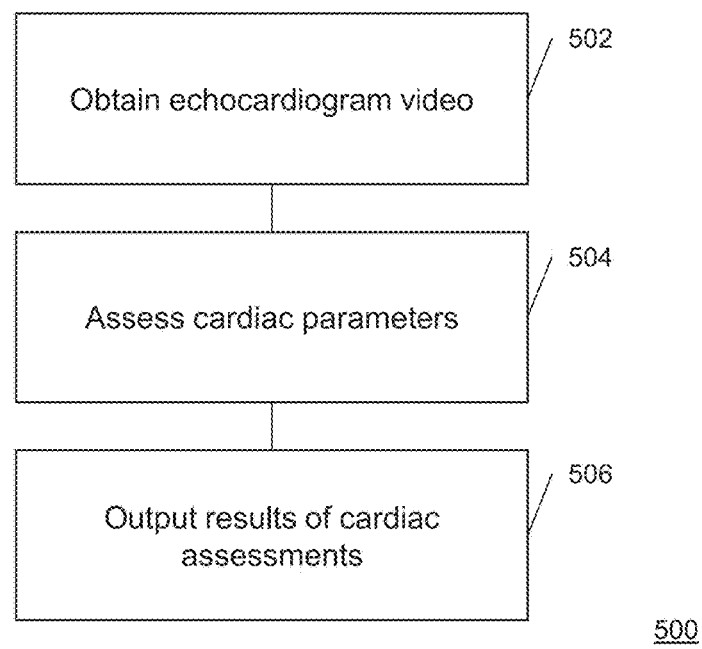
FIG. 5A illustrates a clinical method incorporating machine learning methodologies in accordance with various embodiments of the invention.

Turning to FIG. 5A, a method 500 of determining ejection fraction, biomarker, and/or other characteristics is illustrated in accordance with many embodiments. In a number of embodiments, echocardiogram video or cardiac ultrasound video of an individual's heart is obtained at 502. In many embodiments, the echocardiogram video is obtained live, or real-time, while other embodiments obtain the echocardiogram video as a recording from a previous echocardiogram. In various embodiments, the echocardiogram video is obtained illustrating a relevant angle to capture ventricular details, and any other relevant features. Certain embodiments obtain echocardiogram video from an apical 4-chamber view of an individual's heart. Various embodiments obtain ultrasound video from a large ultrasound device, for example Philips EPIQ Ultrasound Machine, while other embodiments obtain ultrasound video from small or handheld ultrasound systems, for example, GE Healthcare Vscan™.

In various embodiments, the echocardiogram video is obtained locally (e.g., directly from an ultrasound machine), while some embodiments obtain the echocardiogram video remotely, such as across a network or on a cloud-based system. An advantage of remote setups is the ability for a central computing server across a hospital or clinical system to analyze videos obtained systemwide as well as centralize any updates or improvements to a system.

At 504, many embodiments assess cardiac parameters based on the echocardiogram video. Various embodiments identify cardiac function using one or more machine learning models described elsewhere herein. For example, many embodiments perform beat-to-beat evaluation based on spatiotemporal convolutions and semantic segmentation to identify ejection fraction and a heart failure prediction. Further embodiments provide output in the form of biomarker analysis, such as one or more of B-type Natriuretic Peptide (BNP), troponin I, hemoglobin, and blood urea nitrogen (BUN). Further embodiments provide demographic identifiers, such as age, weight, and/or sex/gender. In many embodiments, the output is provided for multiple beats within the video (e.g., 2 beats, 3 beats, 4 beats, 5 beats, 10 beats, etc.).

At 506, many embodiments output results of cardiac assessments from 504. In various embodiments, the output is qualitative, while other embodiments provide output as quantitative measures. For example, for hemoglobin measures, qualitative output could be displayed as "anemic" or "non-anemic," while quantitative measures may provide a determination of hemoglobin concentration. Various embodiments provide both quantitative and qualitative output. Relevant qualitative and quantitative output for various aspects are known to one of skill in the art. Output can be provided as a printout or other hard copy, while some embodiments return the output as an entry into an electronic health record. Further embodiments further allow a doctor, physician, or other medical practitioner to automatically forward results to the individual with a simple option for forwarding upon receipt of the results.

Figure 5B:
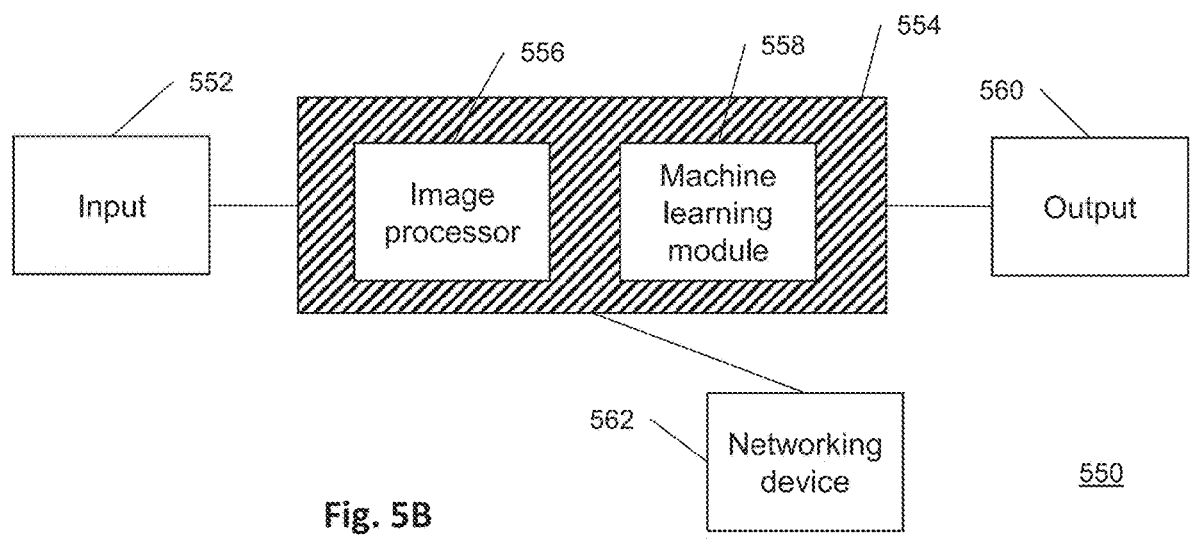
FIG. 5B illustrates a clinical system incorporating machine learning methodologies in accordance with various embodiments of the invention.

Additional embodiments incorporate such methods as software or are embodied as machine readable media that can be performed by a processor. Additionally, some embodiments are directed to systems incorporating such methods into a system 550 for echocardiography. Turning to FIG. 5B, various embodiments describe a system comprising an input device 552 such as an ultrasound wand, probe, or other device configured to obtain ultrasound images from an individual. As noted elsewhere, many embodiments obtain the ultrasound images as video.

Ultrasound images or video are sent to a processing device 554. The processing device 554 can include an image processing component 556 to allow certain annotations or input from a physician or other medical professional, including individual or patient information, such as name, date of birth, date of exam, or other information relevant to the examination. Additional embodiments include a machine learning module 558, such as described herein, to assess cardiac function and other features for the individual's cardiac health.

Further embodiments include an output device 560 to display or provide output from the echocardiography system 550 to medical professional or other individual.

Certain embodiments include a modem or other network connection device 562 to allow for communication between the echocardiography system 550 to other systems, such as a larger healthcare management system.

Exemplary Embodiments

Although the following embodiments provide details on certain embodiments of the inventions, it should be understood that these are only exemplary in nature, and are not intended to limit the scope of the invention.

Methods

Data Curation

A standard full resting echocardiogram study consists of a series of 50-100 videos and still images visualizing the heart from different angles, locations and image acquisition techniques (two-dimensional images, tissue Doppler images, color Doppler images and others). Each echocardiogram video corresponds to a unique patient and a unique visit. In this dataset, one apical four-chamber two-dimensional greyscale video is extracted from each study. Each video represents a unique individual as the dataset contains 10,030 echocardiography videos from 10,030 unique individuals who underwent echocardiography between 2016 and 2018 as part of clinical care at Stanford Health Care. Videos were randomly split into 7,465, 1,277 and 1,288 patients, respectively, for the training, validation and test sets. A summary of the dataset is described in Table 4.

The randomly selected patients in the data have a range of ejection fractions representative of the patient population who visit the echocardiography laboratory. Images were acquired by skilled sonographers using iE33, Sonos, Acuson SC2000, Epiq 5G or Epiq 7C ultrasound machines and processed images were stored in a Philips Xcelera picture archiving and communication system. Video views were identified through implicit knowledge of view classification in the clinical database by identifying images and videos labelled with measurements done in the corresponding view. For example, apical four-chamber videos were identified by selecting videos from the set of videos in which a sonographer or cardiologist traced left ventricle volumes and labelled these for analysis to calculate ejection fraction. The apical four-chamber view video was thus identified by extracting the Digital Imaging and Communications in Medicine (DICOM) file linked to the measurements of the ventricular volume used to calculate the ejection fraction.

An automated preprocessing workflow was used to remove identifying information and eliminate unintended human labels. Each subsequent video was cropped and masked to remove text, electrocardiogram and respirometer information, and other information outside of the scanning sector. The resulting square images were either 600×600 or 768×768 pixels depending on the ultrasound machine and down sampled by cubic interpolation using OpenCV into standardized 112×112 pixel videos. Videos were spot-checked for quality control, to confirm view classification and to exclude videos with color Doppler.

This research was approved by the Stanford University Institutional Review Board and data privacy review through a standardized workflow by the Center for Artificial Intelligence in Medicine and Imaging (AIMI) and the University Privacy Office. In addition to masking of text, electrocardiogram information and extra data outside of the scanning sector in the video files as described above, the video data of each DICOM file was saved as an AVI file to prevent any leakage of identifying information through public or private DICOM tags. Each video was subsequently manually reviewed by an employee of the Stanford Hospital familiar with imaging data to confirm the absence of any identifying information before public release.

Model Design and Training

Model design and training was done in Python using the PyTorch deep learning library. Semantic segmentation was performed using the Deeplabv3 architecture. The segmentation model had a base architecture of a 50-layer residual net and minimized pixel-level binary cross-entropy loss. The model was initialized with random weights and was trained using a stochastic gradient descent optimizer. A model with spatiotemporal convolutions was initialized with pretrained weights from the Kinetics-400 dataset. Three model architectures with variable integration of temporal convolutions (R3D, MC3 and R2+1D) were tested and ultimately chose decomposed R2+1D spatiotemporal convolutions as the architecture with the best performance to use for various embodiments (FIG. 6 and Table 1). In the R3D architecture, all convolutional layers considered the spatial and temporal dimensions jointly and these consisted of five convolutional blocks. The MC3 and R2+1D architectures were introduced as a middle ground between two-dimensional convolutions that considered only spatial relationships and the full three-dimensional convolutions used by R3D29. The MC3 architecture replaced the convolutions in the final three blocks with two-dimensional convolutions, and the R2+1 architecture explicitly factored all of the three-dimensional convolutions into a two-dimensional spatial convolution followed by a one-dimensional temporal convolution.

The models were trained to minimize the squared loss between the prediction and true ejection fraction using a stochastic gradient descent optimizer with an initial learning rate of 0.0001, momentum of 0.9 and batch size of 16 for 45 epochs. The learning rate was decayed by a factor of 0.1 every 15 epochs. For model input, video clips of 32 frames were generated by sampling every other frame (sampling period of 2) with both clip length and sampling period determined by hyperparameter search (FIG. 6). During training, to augment the size of the dataset and increase the variation of exposed training clips, each training video clip was padded with 12 pixels on each side, and a random crop of the original frame size was taken to simulate slight translations and changes in camera location. For all models, the weights from the epoch with the lowest validation loss was selected for final testing. Model computational cost was evaluated using one NVIDIA GeForce GTX 1080 Ti GPU.

Test Time Augmentation with Beat-to-Beat Assessment

There can be variation in the ejection fraction, end-systolic and end-diastolic volumes during atrial fibrillation, and in the setting of premature atrial contractions, premature ventricular contractions and other sources of ectopy. The clinical convention is to identify at least one representative cardiac cycle and use this representative cardiac cycle to perform measurements, although an average of the measurements of up to five cardiac cycles is recommended when there is considerable ectopy or variation. For this reason, our final model used test time augmentation by providing individual estimates for each ventricular beat throughout the entire video and outputs the average prediction as the final model prediction. We use the segmentation model to identify the area of the left ventricle and threshold-based processing to identify ventricular contractions during each cardiac cycle. Each ventricular contraction (systole) was identified by choosing the frames of the smallest left ventricle size as identified by the segmentation arm of EchoNet-Dynamic. For each beat, a subsampled clip centered around the ventricular contraction was obtained and used to produce a beat-by-beat estimate of ejection fraction. The mean ejection fraction of all ventricular contractions in the video was used as the final model prediction.

Assessing Model Performance and Prospective Clinical Validation

The relationship between model performance and the quality of the echocardiogram video were evaluated. The dataset was not curated on clinical quality and no videos were excluded due to insufficient image quality. On the internal Stanford test dataset, the model performance was evaluated with variation in video saturation and gain, and the performance of this embodiment is robust to the range of the acquisition quality of the clinical images. To further test the effect of variable video quality, noise and degraded video quality were simulated by randomly removing a proportion of pixels from videos in the test dataset and evaluated model performance on the degraded images. This embodiment is also robust to a wide range of synthetic noise and image degradation.

Prospective validation was performed by two senior sonographers with advanced cardiac certification and more than 15 years of experience each. For each patient, measurements of cardiac function were independently acquired and assessed by each sonographer on the same day. Every patient was scanned using Epiq 7C ultrasound machines, the standard instrument in the Stanford Echocardiography Laboratory, and a subset of patients were also rescanned by the same two sonographers using a GE Vivid 95E ultrasound machine. Tracing and measurements were done on a dedicated workstation after image acquisition. For comparison, the independently acquired apical four-chamber videos were fed into the model and the variance in measurements assessed.

External Healthcare System Test Dataset

Transthoracic echocardiogram studies from November 2018 to December 2018 from an independent external healthcare system, Cedars-Sinai Medical Center, were used to evaluate the performance of EchoNet-Dynamic in predicting ejection fraction. The same automated preprocessing workflow was used to convert DICOM files to AVI files, mask information outside of the scanning sector and resize input to 112×112-pixel videos of variable length. Previously described methods were used to identify apical four-chamber view videos. After manual exclusion of incorrect classifications, long cine loops of bubble studies, videos with injection of ultrasonic contrast agents and videos with color Doppler, 2,895 videos from 1,267 patients were identified. These videos were used as the input for this embodiment trained on the Stanford dataset and model predictions were compared with human interpretations from physicians at Cedars-Sinai Medical Center. The input video sampling period was set to one as the frame rate of the external dataset was roughly half that of videos from the Stanford dataset. Model predictions from multiple videos of the same patient were averaged to produce a composite estimate of ejection fraction.

Re-Evaluation by Expert Clinicians

Recognizing the inherent variation in human assessment of ejection fraction, five expert sonographers and cardiologists who specialize in cardiovascular imaging performed a blinded review of the echocardiogram videos with the highest absolute difference between the initial human label and the prediction by this embodiment (mean absolute difference of 15.0%, s.d. of 3.79%). Each expert independently received the relevant echocardiogram video and a set of two blinded measurements of ejection fractions that corresponded to the initial human label and the prediction by this embodiment. The experts were asked to select which ejection fraction corresponded more closely to their evaluation of ejection fraction as well as to note any limitations in echocardiogram video quality that would hinder their interpretation. In the blinded review, experts noted that 38% (15 out of 40) of videos had considerable issues with video quality or acquisition and that 13% (5 out of 40) of videos had marked arrhythmia, limiting human assessment of ejection fraction (Table 3). In this setting, the consensus interpretation of the expert clinicians preferred the prediction by this embodiment over the initial human label in 43% (17 out of 40) of the echocardiogram videos.

Statistical Analysis

No statistical methods were used to predetermine sample size. Confidence intervals were computed using 10,000 bootstrapped samples and obtaining 95 percentile ranges for each prediction. The performance of the semantic segmentation task was evaluated using the Dice similarity coefficient compared with the human labels from the held-out test dataset. The performance of the ejection fraction task was evaluated by calculating the mean absolute difference between the prediction of this embodiment and the human calculation of ejection fraction as well as calculating the $R^2$ between the prediction by this embodiment and the human calculation. Prospective comparison with human readers was performed with the uniformly most powerful invariant equivalence test for two-sample problems.

Figures 6A, 6B:
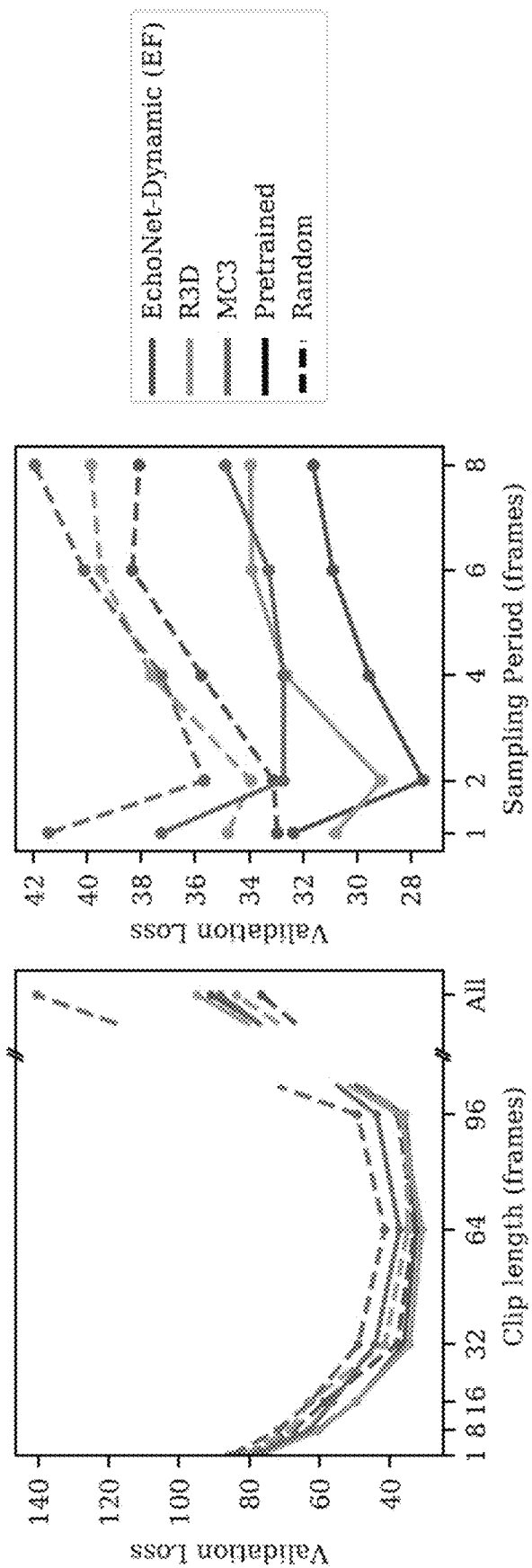
FIGS. 6A-6B illustrate hyperparameter search for spatiotemporal convolutions on the video dataset to predict ejection fraction in accordance with various embodiments of the invention.

Results:

FIGS. 6A-6B illustrate a hyperparameter search for spatiotemporal convolutions on the video dataset to predict ejection fraction. Specifically, model architecture (R2+1D, which is the architecture selected by many embodiments for ejection fraction prediction, R3D and MC3), initialization (solid line, Kinetics-400 pretrained weights; dotted line, random initial weights), clip length (1, 8, 16, 32, 64, 96 and all frames), and sampling period (1, 2, 4, 6 and 8) were considered. In FIG. 6A, when varying clip lengths, performance is best at 64 frames (corresponding to 1.28 s) and starting from pretrained weights improves performance slightly across all models. In FIG. 6B, varying sampling period with a length to approximately correspond to 64 frames before subsampling. As illustrated in FIG. 6B, performance was best with a sampling period of 2.

Conclusions:

Embodiments are capable of automating ventricular segmentation and outperform prior methods in terms of variance, specificity, and sensitivity for segmentation, cardiac function, and biomarker identification.

DOCTRINE OF EQUIVALENTS

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the foregoing examples and descriptions of various preferred embodiments of the present invention are merely illustrative of the invention as a whole, and that variations in the components or steps of the present invention may be made within the spirit and scope of the invention. Accordingly, the present invention is not limited to the specific embodiments described herein, but, rather, is defined by the scope of the appended claims.

TABLE 1

Performance of certain embodiments (e.g., EchoNet-Dynamic) compared with alternative deep learning architectures in assessing cardiac function

| Model | Evaluation | Sampling Period | MAE | RMSE | $R^2$ |
|---|---|---|---|---|---|
| EchoNet-Dynamic | Beat-by-beat | 1 in 2 | 4.05 | 5.32 | 0.81 |
| EchoNet-Dynamic (EF) | 32 frame sample | 1 in 2 | 4.22 | 5.56 | 0.79 |
| R3D | 32 frame sample | 1 in 2 | 4.22 | 5.62 | 0.79 |
| MC3 | 32 frame sample | 1 in 2 | 4.54 | 5.97 | 0.77 |
| EchoNet-Dynamic (EF) | All frames | All | 7.35 | 9.53 | 0.40 |
| R3D | All frames | All | 7.63 | 9.75 | 0.37 |
| MC3 | All frames | All | 6.59 | 9.39 | 0.42 |

TABLE 2

Videos with the most discordance between model prediction and human label of ejection fraction

| Video File | Model EF | Human EF | Difference | Rev 1 | Rev 2 | Rev 3 | Rev 4 | Rev 5 | Notes |
|---|---|---|---|---|---|---|---|---|---|
| 0X4EFB94EA8F9FC7C2 | 44.6 | 17.7 | 26.9 | B | B | B | B | A | Poor image quality |
| 0XB3FFC4AE334E9F4 | 55.4 | 30.1 | 25.4 | B | A | B | B | B | |
| 0X15C0D7DBFF8E4FC8 | 57.8 | 34.8 | 23.1 | A | A | A | A | A | Poor image quality, incorrect label |
| 0X41AC5C5FC2E3352A | 59.5 | 37.9 | 21.6 | A | A | A | A | A | Arrhythmia, incorrect label |
| 0X211D307253ACBEE7 | 31.0 | 10.7 | 20.3 | A | B | B | B | B | Poor image quality, foreshortening |
| 0X5A8D9673920F03FE | 46.3 | 26.7 | 19.6 | A | B | B | B | B | |
| 0X75AF130134AADF00 | 46.8 | 28.4 | 18.4 | B | A | B | A | B | Arrhythmia |
| 0X6703FCFAD2E7CBCA | 37.1 | 54.5 | 17.4 | A | A | A | A | A | Poor image quality, incorrect label |
| 0X345D4E0B1B2EBAA1 | 67.2 | 84.5 | 17.3 | B | A | A | A | A | Incorrect label |
| 0X1B2BCDAE290F6015 | 43.8 | 28.4 | 15.4 | B | A | B | A | B | Poor image quality |
| 0X15CC6C50F1763B61 | 34.9 | 50.2 | 15.2 | A | A | B | B | B | |
| 0X7D567F2A870FD8F0 | 44.1 | 29.1 | 15.0 | B | B | B | A | A | |
| 0X2507255D8DC30B4E | 52.0 | 66.8 | 14.8 | A | A | A | A | A | Poor image quality, incorrect label |
| 0X493E34208D40DBB5 | 51.8 | 37.1 | 14.7 | B | B | B | A | A | |
| 0X56FD0409BFA202DF | 39.1 | 53.7 | 14.6 | A | A | B | A | A | Incorrect label |
| 0X2D4304FA6A09F93E | 37.2 | 23.2 | 14.0 | A | B | B | B | B | |
| 0X1EDA0F3F33F97A9D | 49.0 | 35.0 | 14.0 | B | B | B | B | B | Poor image quality |
| 0X66C8EAE88FFB77EE | 54.0 | 40.1 | 13.9 | B | B | A | B | B | |
| 0X1EF35FFC92F4F554 | 47.7 | 61.4 | 13.7 | B | B | B | B | A | Incorrect label |
| 0X1CDE7FECA3A1754B | 37.2 | 50.9 | 13.7 | B | A | A | A | B | Arrhythmia, incorrect label |
| 0X777692B30E35465A | 39.4 | 53.0 | 13.6 | B | A | B | B | B | |
| 0X29E66C557C99EC32 | 52.0 | 65.5 | 13.6 | B | B | B | B | B | |
| 0X31B6E6B67B97806A | 54.0 | 40.4 | 13.5 | A | A | A | A | A | Incorrect label |
| 0X30DF42C999969D67 | 43.4 | 30.0 | 13.3 | B | B | B | B | B | |
| 0X36715FD73D74BF39 | 49.2 | 36.0 | 13.2 | A | B | B | B | A | Poor image quality, Effusion |
| 0XAA3E06425E1A23E | 46.3 | 33.1 | 13.1 | A | B | A | B | A | Incorrect label |
| 0X60361B7F301DEBB7 | 55.2 | 68.3 | 13.0 | B | A | A | A | A | Incorrect label |
| 0X32AFF6A0BED73A67 | 74.2 | 61.6 | 12.6 | A | A | A | B | A | Incorrect label |
| 0X8558D35ED09F890 | 52.7 | 40.4 | 12.4 | A | B | B | A | A | Poor image quality, incorrect label |
| 0X868028466F66DE2 | 43.9 | 56.2 | 12.3 | B | A | B | B | B | |
| 0X41130893A44122AB | 54.0 | 66.3 | 12.3 | B | A | B | B | A | Poor image quality |
| 0X69447E46FEDD2A3F | 49.3 | 61.5 | 12.3 | A | A | A | B | A | Poor image quality, incorrect label |
| 0X797CA10A7CDE384B | 62.8 | 75.0 | 12.2 | B | A | B | A | A | Poor image quality, incorrect label |
| 0XBCEAB22A81A23C1 | 25.4 | 13.3 | 12.2 | A | B | B | B | A | Foreshortening |
| 0X2889D8C33077C148 | 57.0 | 69.1 | 12.1 | B | A | A | B | B | Arrhythmia |
| 0X6DFE8F195ACC3BA4 | 18.0 | 30.1 | 12.1 | B | A | B | B | B | |
| 0X62431BB9CF3A33EE | 44.4 | 56.4 | 12.1 | A | A | A | A | A | Arrhythmia, incorrect label |
| 0X27250C8B6DF1D971 | 67.7 | 79.7 | 12.0 | B | A | A | B | A | Poor image quality, foreshortening |
| 0X79DFCFF4867CB797 | 31.9 | 43.9 | 12.0 | A | B | A | B | B | |
| 0X2DF88C27BB20C25D | 55.9 | 43.9 | 12.0 | B | A | A | B | A | Foreshortening, incorrect label |

TABLE 3

Model parameters and computational cost

| Task | Model | Parameters (millions) | Time per prediction (sec) Train | Time per prediction (sec) Test | Memory per prediction (GB) Train | Memory per prediction (GB) Test |
|---|---|---|---|---|---|---|
| End-to-end | EchoNet-Dynamic | 71.1 | 0.221 | 0.048 | 1.191 | 0.276 |
| EF | EchoNet-Dynamic (EF) | 31.5 | 0.150 | 0.034 | 1.055 | 0.246 |

TABLE 3-continued

Model parameters and computational cost

| Task | Model | Parameters (millions) | Time per prediction (sec) Train | Time per prediction (sec) Test | Memory per prediction (GB) Train | Memory per prediction (GB) Test |
|---|---|---|---|---|---|---|
| Prediction | R3D | 33.4 | 0.084 | 0.025 | 0.394 | 0.184 |
|  | MC3 | 11.7 | 0.110 | 0.035 | 0.489 | 0.151 |
| Segmentation | EchoNet-Dynamic (Seg) | 39.6 | 0.071 | 0.014 | 0.136 | 0.030 |

TABLE 4

Summary statistics of patient and device characteristics in the dataset

| Statistic | Total | Training | Validation | Test |
|---|---|---|---|---|
| Number of Patients | 10,030 | 7,465 | 1,288 | 1,277 |
| Demographics |  |  |  |  |
| Age, years (SD) | 68 (21) | 70 (22) | 66 (18) | 67 (17) |
| Female, n (%) | 4,885 (49%) | 3,662 (49%) | 611 (47%) | 612 (48%) |
| Heart Failure, n (%) | 2,874 (29%) | 2,113 (28%) | 356 (28%) | 405 (32%) |
| Diabetes Mellitus, n (%) | 2,018 (20%) | 1,474 (20%) | 275 (21%) | 269 (21%) |
| Hypercholesterolemia, n (%) | 3,321 (33%) | 2,463 (33%) | 445 (35%) | 413 (32%) |
| Hypertension, n (%) | 3,936 (39%) | 2,912 (39%) | 525 (41%) | 499 (39%) |
| Renal Disease, n (%) | 2,004 (20%) | 1,475 (20%) | 249 (19%) | 280 (22%) |
| Coronary Artery Disease, n (%) | 2,290 (23%) | 1,674 (22%) | 302 (23%) | 314 (25%) |
| Metrics |  |  |  |  |
| Ejection Fraction, % (SD) | 55.7 (12.5) | 55.7 (12.5) | 55.8 (12.3) | 55.3 (12.4) |
| End Systolic Volume, mL (SD) | 43.3 (34.5) | 43.2 (36.1) | 43.3 (34.5) | 43.9 (36.0) |
| End Diastolic Volume, mL (SD) | 91.0 (45.7) | 91.0 (46.0) | 91.0 (43.8) | 91.4 (46.0) |
| Machine |  |  |  |  |
| Epiq 7C, n (%) | 6,505 (65%) | 4,832 (65%) | 843 (65%) | 830 (65%) |
| iE33, n (%) | 3,329 (33%) | 2,489 (33%) | 421 (33%) | 419 (33%) |
| CX50, n (%) | 83 (1%) | 62 (1%) | 12 (1%) | 9 (1%) |
| Epiq 5G, n (%) | 60 (1%) | 44 (1%) | 5 (0%) | 11 (1%) |
| Other, n (%) | 53 (1%) | 38 (1%) | 7 (1%) | 8 (1%) |
| Transducer |  |  |  |  |
| X5, n (%) | 6,234 (62%) | 4,649 (62%) | 794 (62%) | 791 (62%) |
| S2, n (%) | 2,590 (26%) | 1,913 (26%) | 345 (27%) | 332 (26%) |
| S5, n (%) | 1,149 (12%) | 863 (12%) | 141 (11%) | 145 (11%) |
| Other or Unspecified, n (%) | 57 (1%) | 40 (1%) | 8 (1%) | 9 (1%) |
| Day of the Week |  |  |  |  |
| Monday, n (%) | 1,555 (16%) | 1,165 (16%) | 210 (16%) | 180 (14%) |
| Tuesday, n (%) | 1,973 (20%) | 1,411 (19%) | 269 (21%) | 293 (23%) |
| Wednesday, n (%) | 2,078 (21%) | 1,522 (20%) | 270 (21%) | 286 (23%) |
| Thursday, n (%) | 2,144 (21%) | 1,642 (22%) | 248 (19%) | 254 (20%) |
| Friday, n (%) | 2,018 (20%) | 1,461 (20%) | 237 (18%) | 221 (17%) |
| Saturday, n (%) | 221 (2%) | 155 (2%) | 35 (3%) | 31 (2%) |
| Sunday, n (%) | 140 (1%) | 109 (1%) | 19 (1%) | 12 (1%) |

The invention claimed is:

1. A method for analyzing images obtained from an echocardiogram, comprising:
   obtaining a cardiac ultrasound video of an individual's heart illustrating at least one view of a heart of the patient and comprising a plurality of cardiac cycles;
   assessing at least one cardiac parameter based on the cardiac ultrasound video, comprising:
   using a first machine learning model comprising spatiotemporal convolutions,
   using a second machine learning model comprising atrous convolutions, to generate frame-level semantic segmentation of a left ventricle throughout a cardiac cycle, and
   performing a beat-by-beat evaluation based on the spatiotemporal convolution and semantic segmentation to generate a plurality of clips of frames, wherein each clip of frames in the plurality of clips of frames represents one cardiac cycle and determining an ejection fraction for each cardiac cycle; and
   outputting an average ejection fraction of the heart for the patient based on the plurality of clips of frames.

2. The method of claim 1, wherein the spatiotemporal convolutions incorporate two dimensions of spatial information and temporal information as a third dimension.

3. The method of claim 1, wherein the assessing at least one cardiac parameter step further comprises determining at least one biomarker, wherein the at least one biomarker is selected from selected from B-type Natriuretic Peptide, troponin I, hemoglobin, and blood urea nitrogen.

4. The method of claim 1, wherein the cardiac ultrasound video is obtained in real-time or as a recording.

5. The method of claim 1, wherein the cardiac ultrasound video is obtained from a large ultrasound device or a small ultrasound device.

6. The method of claim 1, wherein the cardiac ultrasound video is obtained across a network.

7. An echocardiography system comprising:
a processing device comprising a machine learning module for assessing at least one cardiac parameter based on the cardiac ultrasound video, wherein the machine learning module comprises:
   a first machine learning model comprising spatiotemporal convolutions;
   a second machine learning model comprising atrous convolutions, to generate frame-level semantic segmentation of a left ventricle throughout a cardiac cycle; and
   performs a beat-by-beat evaluation based on the spatiotemporal convolution and semantic segmentation to generate a clip of frames representing a cardiac cycle.

8. The echocardiography system of claim 7, wherein the spatiotemporal convolutions incorporate two dimensions of spatial information and temporal information as a third dimension.

9. The echocardiography system of claim 7, wherein the assessing at least one cardiac parameter step further comprises determining at least one biomarker, wherein the at least one biomarker is selected from selected from B-type Natriuretic Peptide, troponin I, hemoglobin, and blood urea nitrogen.

10. The echocardiography system of claim 7 further comprising an input device configured to obtain ultrasound video.

* * * * *